Mar. 6, 1923.
M. R. HUDSON
TRAWL
Filed July 21, 1921
1,447,553
2 sheets-sheet 2
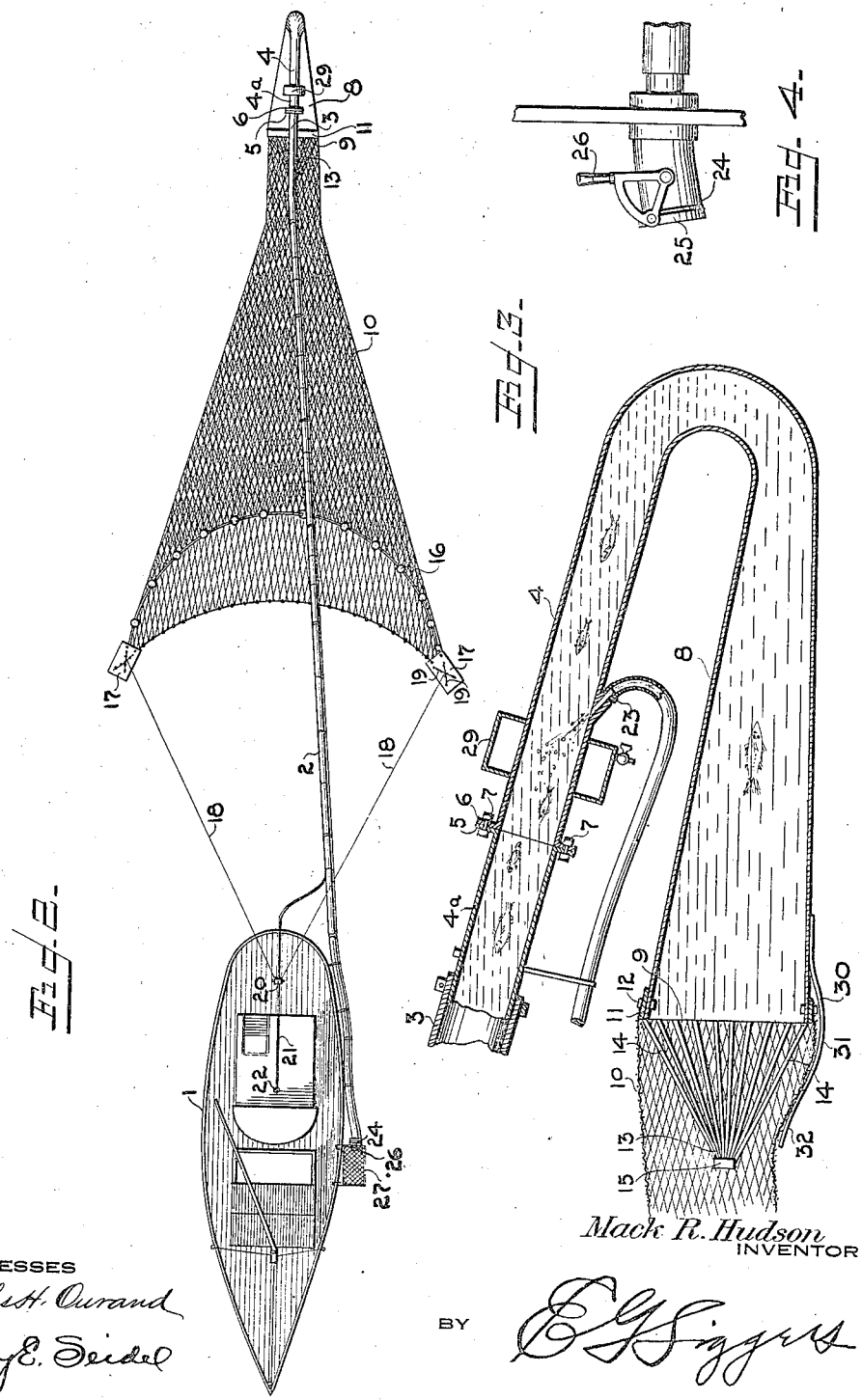

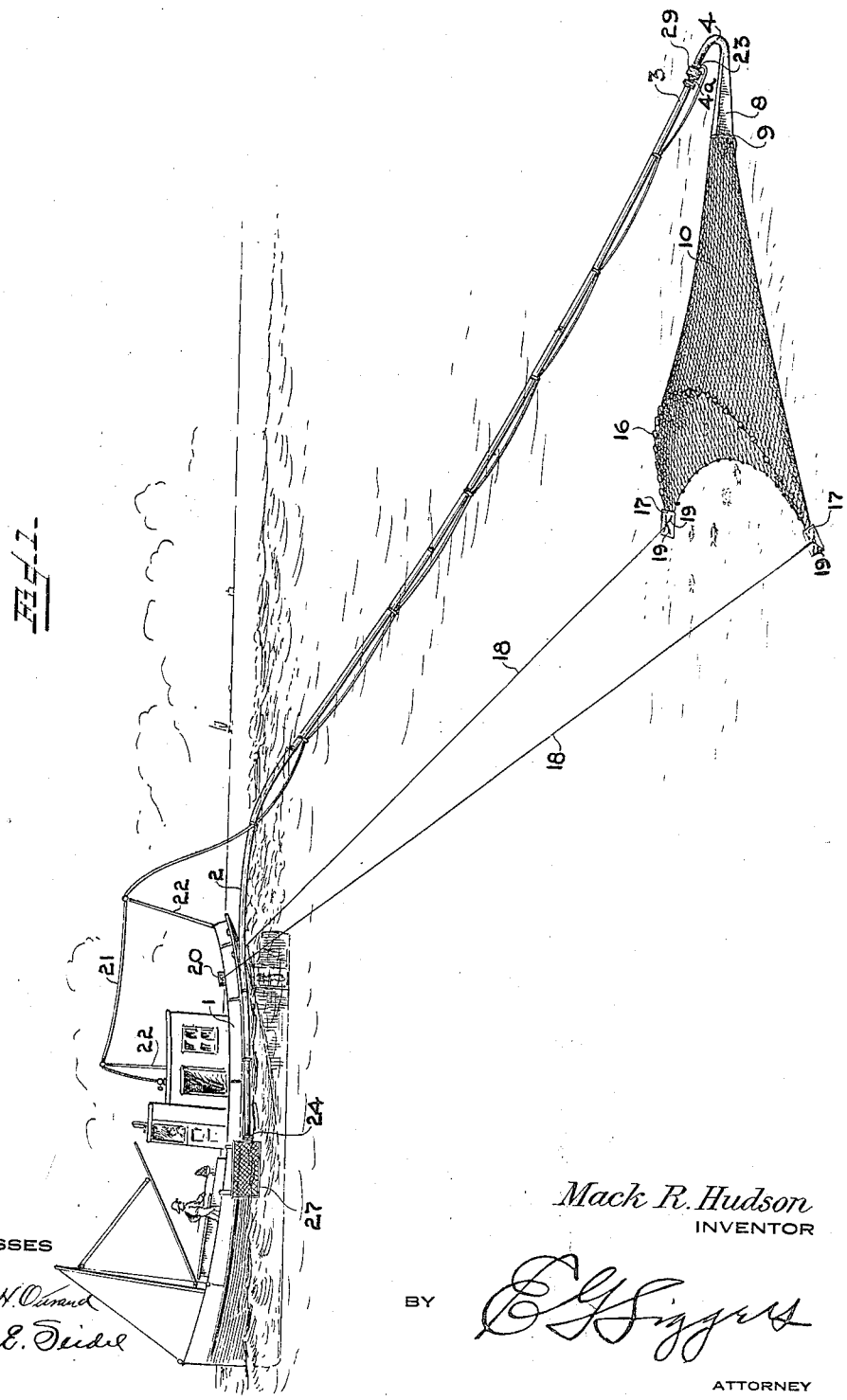

Patented Mar. 6, 1923.

1,447,553

UNITED STATES PATENT OFFICE.

MACK R. HUDSON, OF GRETNA, LOUISIANA.

TRAWL.

Application filed July 21, 1921.  Serial No. 486,341.

*To all whom it may concern:*

Be it known that I, MACK R. HUDSON, a citizen of the United States, residing at Gretna, Jefferson Parish, and State of Louisiana, have invented a new and useful Trawl, of which the following is a specification.

This invention relates to a device for catching fish, and is more particularly directed to a trawl adapted to be dragged along the bed of a stream for collecting and forcing shrimp upwardly through a conduit to a floating means located on the surface of the water.

Heretofore, in dragging nets along the bed of a stream in order to catch fish or shrimp, it frequently happens that the net will pass by a school of fish without trapping any, or it will pass through a school and catch a certain quantity, but as the net is in motion it will also pass beyond the school. If the presence of the fish were detected in time, the path could be retraced after the net had been emptied, but a great deal of time will have been lost in the meantime and it might be impossible to find the fish. Furthermore, it will be seen that no means are employed by which it is possible to detect the school of fish or shrimp. The detection in this case depends merely upon experimentation.

It is an object of my invention to be able to detect immediately when the trawl is passing through a school of fish or shrimp, and likewise to deliver the same to a floating means upon the surface of the water in a new and improved manner. It is also a purpose of my invention to use the means that delivers the fish to the floating means for cleansing the conduit when it occasionally becomes obstructed by extraneous matter.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Fig. 1 is a view in perspective of my improved device for catching fish secured in operative relation with the boat.

Fig. 2 is a plan view of the same.

Fig. 3 is a detail view in vertical section of the trawl.

Fig. 4 discloses a view in detail of a valve for closing the end of the conduit through which fish and water are forced.

While I have primarily designed my device for catching shrimp, I wish it to be understood that it is equally applicable for catching fish and furthermore than the limitation "fish" is used broadly throughout the specification to include shrimp.

In the drawings, 1 designates any kind of a floating means, such as a vessel generally used for the purpose of fishing, located on the surface of a body of water, and to which is connected one end of a pipe line 2 of flexible tubing, the other end 3 being located below the surface of the water and near the bed of the body of said water and forced over the end of a metal tubing $4^a$ and clamped thereon. A bent tubing 4 is connected to the tube $4^a$ by means of flanges 5 and 6, and bolt 7, in order to form an air and water-tight seal between the joints. The tubing 4 has a funnel-shaped portion 8 located below the portion 4 gradually increasing in width to a mouth 9 upon which is secured a net 10 by means of the ring 11 and bolts 12. The ring or pad 11 may be of flexible material on which the small end of the net is sewed.

Projecting outwardly from the mouth 9 of the return portion 8 is a conical member 13 formed of a number of bars 14 which are adapted to be connected at their ends by a fastening means 15 to form a screen to prevent débris and large fish from being drawn through the mouth 9 of the apparatus. When the apparatus is employed to catch fish instead of shrimp, the conical member 13 will be removed.

The net, when extended, is conically shaped and is provided at its mouth with a distending member 16 adapted to maintain the mouth in an open position. To the two sides of the net, preferably near the bottom of the same, are secured two blocks 17 preferably of wood to hold the mouth of the net close to the bed of the stream.

These blocks are adapted to be connected to the boat 1 by means of the ropes 18. A series of ropes 19 which are secured in any approved manner near the ends of the blocks are brought diagonally towards the center to be secured to the ropes 18. The upper ends of the ropes 18 are preferably connected to a windlass 20 located on the deck of the boat 1.

An air conduit 21, preferably of flexible tubing, is directed from either an air tank or air pump located on the deck of the boat and may, as shown in Fig. 1, be carried overhead upon the posts 22 and then downwardly and alongside of the conduit 2 and connected thereto by any improved fastening means. The air conduit is provided with a connection 23 to the tubing 4 so that as a valve is opened in the air line, air will be forced into the tube 4 and upwardly in the conduit 2 to cause the water in said conduit, together with any small fish and shrimp that may have been drawn into the conduit 4 from the net 10, to be forced upwardly through said conduit, outwardly through the mouth 24, past the valve 25, normally kept open by a handle 26, and into a container 27. The container is constructed of wire netting of a very fine mesh which is adapted to strain the water flowing from the conduit 2 and to prevent the escape of shrimp, but which nevertheless will permit the water and dirt to pass therethrough. As the shrimp are deposited in the container, they are thoroughly washed of any mud by the water pouring from the mouth of the tube 2.

The container 27 is secured to the side of the vessel 1 and sufficiently below the side of the boat to permit the container to be partially submerged in order that shrimp or fish may be maintained in water and kept alive.

If it be necessary at any time to remove obstructions that have been drawn into the funnel-shaped portion 8 of the conduit 4 by the water from the net 10, the handle 26 may be operated to close the valve 25 upon the end 24 of the pipe 2, when the direction of the water in the tube 2 will be reversed and cause the obstruction to be forced outwardly through the funnel-shaped portion 8, beyond the net.

In lowering the trawl and the conduit 2, it will be noted that the same will have a tendency to turn sidewise as it sinks through the water so that the net 10 will not lie in proper position upon the bed of the stream. To prevent this, and maintain the tube 4 in upright position, a chamber 29 is secured upon the lower end of the conduit 2, or as shown in Fig. 3, upon the conduit 4, and the air having been pumped out of the same will cause the conduit 4 to partially float and carry the conduit 4 always above the funnel-shaped member 8, so that the member 8 will always sink first and lay the net 10 properly on the bed of the stream.

On the outer end of the funnel-shaped portion 8 of the conduit is secured a runner 30 which is bent downwardly, forming a rounded portion 31, and then bent upwardly at 32 to engage the bottom of the net 10. The object of this runner 30 is to prevent the mouth 9 of the funnel-shaped portion 8 from digging into the bed of the stream, which, if this were not used, would be harmful to the device. The conical member 13 likewise assists in lifting the mouth of the member 8.

Furthermore, the air chamber 29 cooperates with the runner 30 to cause the funnel-shaped member 8 to ride properly on the bed of the stream, since the chamber 29 tends to hold the conduit 4 in an elevated position while the runner 30 causes the funnel-shaped member 8 to glide properly over the bed of the stream.

The method of operating my device is as follows:—The conduit 2 and the air line 21 are thrown overboard from the vessel 1, together with the net 10. The ropes 18 are let out from the windlass 20 and the vessel 1 may be started in motion as the pipe line 2 and the ropes 18 are let out, so that the net 10 will be forced downwardly through the water towards the bottom. The air chamber 29 secured to the end of the conduit 2, will cause the end of the tubing 2 to remain always in an elevated position above the funnel-shaped member 8, while the blocks 17 secured to the mouth of the net 10 will likewise cause the end of the net to sink and ride readily towards the bed of the stream. When the ropes 18 and the conduit 2 are let out sufficiently, the trawl, comprising the net and the conduit 2, will begin to drag upon the bed and the runner 3 in the bottom of the funnel-shaped member 8, will ride upon said bed. The outlet 24 of the conduit 2 is maintained above the surface of the water and enters the container 27 with the valve 25 in open position.

Air from a tank or an air pump is forced through the air line 21 to a point near the depressed portion of the conduit 2, and as this air is forced into the conduit, water will be forced to circulate in the conduit 2 and drain into the container 27.

If at any time it will be noticed that shrimp or fish are flowing with the water out of the mouth 24 of the tube 2, the vessel will be kept in motion and the course repeatedly retraced at this point to gather in as many shrimp as possible. At the same time, the air will be continued through the line 21 to maintain the circulation of water to force any small fish or shrimp that are passing through the net upwardly through the conduit 2 and into the container 27.

It will be seen that by this device, shrimp or fish may not only be caught but their presence will be detected immediately, since communication between water at the bed of the stream and the vessel is established by the air pressure causing a circulation of the water and any fish or shrimp that happen to pass through the net are carried upwardly through the conduit to the container 27. The trawl will always be in motion and the vessel will be repeatedly turned back over this spot dragging the trawl each time through the school until it is noticed that no more shrimp or fish are passing into the container when it may resume its journey until another school is detected.

What is claimed is:—

1. In a trawl, a net provided with open ends, a pipe line connected to one end of the net, and means for causing circulation of water from the net through the pipe line, and means on the lower end of the pipe line for selectively eliminating objects within certain limits of size to the pipe, said means comprising a plurality of spaced bars arranged to form a conical member, the apex of which extends outwardly from the end of the pipe into the net.

2. In a trawl, a net provided with open ends, a pipe line connected to one end of the net, means for causing circulation of water from the net through the pipe line, and means for closing the upper end of the pipe line to cause the water to force obstructions out of said pipe line.

3. In a trawl, a net provided with an entrance and an exit adapted to be dragged along the bed of a stream, a floating means, connections between said floating means and the entrance of the net, a conduit in alinement with and secured to the exit of the net, means for causing circulation of water from the net through said conduit, a straining means secured to said floating means and adapted to receive the water passing through said conduit from the net, a valve in the pipe line adapted to cut off communication between the pipe line and the straining means to cause a reversal of the flow of water through the pipe line.

4. In a trawl, a net provided with an entrance and an exit, a pipe line in alinement with and connected to the exit of said net, a floating means having connections with the entrance of the net, means for causing the water to flow from the net through the pipe line, the upper end of said pipe line being supported by the floating means, and means secured to the end of the pipe to direct the end of the pipe and the net away from the bed of the stream, said last-mentioned means being curved downwardly from and in spaced relation with the end of the pipe line and net, and then curved upwardly into engagement with said net.

5. In a trawl, a net provided with an entrance and an exit, a pipe line having a return bend portion located below the pipe line and connected to the exit of said net, a floating means having connection with the pipe line, means connected to that portion of the pipe line which is directly above the return bend portion for causing water to flow from the net through the pipe line to the floating means.

6. In a trawl, a net provided with an entrance and an exit, a pipe line in alinement with and connected to the exit of said net, a floating means having connections with the entrance of the net, means for causing circulation of the water from the net through the pipe line, the upper end of said pipe line being supported by the floating means, means secured to the end of the pipe to direct the end of the pipe and the net away from the bed of the stream, and a receptacle in communication with the pipe line adapted to strain the water forced from said pipe line, and means to cut off communication between the pipe line and the receptacle to cause a reversal of the flow of water through the pipe line.

7. In a trawl, a net provided with open ends, a pipe line connected to one end of the net, a container located at the surface of a body of water, means for causing flow of water from the net through the pipe line, into the container, and means for reversing the flow of said water.

8. In a trawl, a net provided with open ends, a pipe line connected at its lower end to one end of the net, means for causing water to flow from the net through the pipe line and out of upper end of pipe line, and means cooperating with said means for causing water to flow in a reverse direction through said pipe line.

9. In a trawl, a net provided with open ends, a pipe line, a conduit having a funnel-shaped portion returned below the conduit and connected to an open end of the net, the conduit being connected to the pipe line, and for causing circulation of water from the net through the pipe line, said means consisting of an air conduit connected to the other conduit and having its lower end entering said other conduit above the funnel-shaped portion.

10. In a trawl, a net provided with open ends, a pipe line connected to one end of the net, means for causing water to flow from the net through the pipe line, and means enclosed by the net and secured to one end of the pipe for selectively admitting objects with the water to the pipe line remote from the mouth of the net.

11. In a trawl, a net provided with open ends, a pipe line connected to and communicating with one of said open ends, a perforated container into which the pipe line discharges, and an air conduit discharging into the pipe line and communicating with a source of compressed air, the air discharged from said air conduit causing the fish to pass up the air line to the container, and means on the end of the pipe line for directing the net and the end of said pipe away from the mud at the bottom of a stream whereby substantially clear water is forced through the pipe line.

In testimony that I claim the foregoing as my own, I have hereto affixed my signature.

MACK R. HUDSON.